United States Patent
Martinie

[11] Patent Number: 5,529,403
[45] Date of Patent: *Jun. 25, 1996

[54] BEARING ASSEMBLY

[75] Inventor: Howard M. Martinie, Simpsonville, S.C.

[73] Assignee: Reliance Electric Industrial Company, Greenville, S.C.

[*] Notice: The term of this patent shall not extend beyond the expiration date of Pat. No. 5,373,636.

[21] Appl. No.: 358,875

[22] Filed: Dec. 19, 1994

[51] Int. Cl.$^6$ .................................................. F16C 43/04
[52] U.S. Cl. ........................... 384/585; 381/538; 381/540
[58] Field of Search ................................. 384/538, 540, 384/585, 584, 581, 478, 485; 403/370

[56] References Cited

U.S. PATENT DOCUMENTS

| | | | |
|---|---|---|---|
| 738,445 | 9/1903 | Hoffmann | 384/540 |
| 1,526,008 | 2/1925 | Olson | 384/540 |
| 1,843,463 | 2/1932 | Tawresey . | |
| 2,043,272 | 6/1936 | Wallgren . | |
| 3,033,597 | 5/1962 | Miller . | |
| 3,497,274 | 2/1970 | Yardley . | |
| 3,510,138 | 5/1970 | Bowen et al. | 384/478 X |
| 3,807,820 | 4/1974 | Schuhmann | 384/538 |
| 3,953,142 | 4/1976 | Price et al. | 403/331 |
| 4,364,687 | 12/1982 | Adell | 403/370 |
| 5,009,539 | 4/1991 | Muellenberg | 403/370 |
| 5,011,301 | 4/1991 | Martinie | 384/140 |
| 5,011,306 | 4/1991 | Martinie | 384/585 |
| 5,067,847 | 11/1991 | Muellenberg | 403/370 |
| 5,373,636 | 12/1994 | Martinie | 29/898.08 |

FOREIGN PATENT DOCUMENTS

| | | |
|---|---|---|
| 0235366A2 | 9/1987 | European Pat. Off. . |
| 2120360 | 11/1983 | United Kingdom . |

*Primary Examiner*—Thomas R. Hannon
*Attorney, Agent, or Firm*—Dority & Manning

[57] ABSTRACT

A bearing assembly includes an improved arrangement for securement to a shaft. An inner ring member having a tapered inner surface is received over a tapered adapter having a tapered outer surface. The tapered adapter includes an annular flange at a larger diameter end thereof. A split ring removal tool can be utilized to engage the flange to facilitate removal of the bearing assembly from the shaft. The bearing assembly also includes a pair of sealing assemblies carrying a primary sealing lip and an optional auxiliary sealing lip. When desired, flinger members may be provided to engage the auxiliary sealing lips. One of the flinger members may be situated between an outside endwall of the inner ring member and an inside endwall of the annular flange. In this case, a unitary removal ring may be situated adjacent such flinger member.

22 Claims, 5 Drawing Sheets

BEARING ASSEMBLY

BACKGROUND OF THE INVENTION

The present invention relates generally to the art of bearings for facilitating shaft rotation. More particularly, the invention relates to a bearing assembly which incorporates an improved sealing arrangement while also having an improved securement and removal feature.

Bearing assemblies are often designed to be quickly attached to a shaft. Typically, the bearing assembly is first slipped along the shaft to the desired position. Once there, the inner ring of the bearing assembly is secured utilizing one of various clamping techniques.

A common clamping technique involves the use of a tapered adapter having a tapered outer surface. Such a tapered adapter defines an axial bore for receipt of a shaft therethrough and further defines a radial slot extending along its length. A bearing assembly having a receiving bore with a tapered inner surface is situated about the tapered adapter. The bearing assembly and the tapered adapter are forced axially into one another. As a result, the tapered adapter is closed around the shaft. Further movement of the bearing assembly along the tapered outer surface achieves a press fit between the various components.

The result of high pressure between components, low angle of taper between the opposed tapered surfaces and the coefficient of friction of metal-to-metal militates that a high force is necessary to remove the bearing assembly from the tapered adapter. In addition, fretting corrosion often develops at the interface of the bearing bore and the adapter. This corrosion further increases the force required to remove the bearing. The lack of a convenient technique for applying force from the shaft to the bearing face has frequently necessitated that the bearing itself be destroyed with a cutting torch in order to effect its removal. In addition to destruction of the bearing, this technique risks damage to the shaft itself. Because the shafts are not of a single diameter and are of varying lengths, the use of standard removal tools such as gear pullers and the like has not been considered practical.

Various configurations of seals are often utilized to isolate the interior of the bearing assembly from the ambient environment. For example, it may be desirable to prevent lubricant within the bearing from escaping too quickly to the ambient environment, thus presenting an unsightly appearance on or around the bearing. Additionally, it is desirable to prevent contaminants in the ambient environment from penetrating the bearing interior and causing damage to the bearing elements located therein.

The degree of sealing necessary for a particular application will depend upon the duty requirements of such application. For example, a light seal may be suitable for high speed and normal contaminate service. In other applications, it may be necessary to provide a bearing assembly having enhanced sealing characteristics. For economic and other considerations, it is desirable that a single bearing assembly be provided that may be easily adapted from a light sealing to a heavy sealing configuration.

SUMMARY OF THE INVENTION

The present invention recognizes and addresses the foregoing disadvantages, and others, of prior art constructions and methods.

Accordingly, it is an object of the present invention to provide an improved bearing assembly.

It is another object of the present invention to provide an improved bearing assembly which is adapted to be easily secured and removed from a shaft.

It is also an object of the present invention to provide an improved bearing assembly which may be quickly adapted to have either light sealing or heavy sealing characteristics.

It is also an object of the present invention to provide an improved arrangement for securing a device such as a bearing have a tapered inner bore to a shaft and effecting removal of such device therefrom.

Some of these objects are achieved by a bearing assembly for receipt of a shaft therein. The bearing assembly comprises a tapered adapter defining a first axial bore for receipt of the shaft therethrough and having a radially slot extending along the length thereof. The tapered adapter further defines a tapered outer surface extending between a first end of lesser diameter and a second end of greater diameter than the first end. The tapered adapter also has an annular flange located proximate the second end.

The bearing assembly also includes a bearing inner ring member defining an inner race way about an outer surface thereof. The bearing inner ring member further defines a second axial bore having a tapered inner surface for receipt of the tapered adapter therein. A bearing outer ring member defines an outer race way about an inner surface thereof. The outer ring member is situated such that its outer race way is radially outward of the inner race way defined by the inner ring member. A plurality of bearing elements are disposed between the inner race way and the outer race way to permit relative rotation between the inner ring member and the outer ring member.

Securement means are provided for axially moving together the tapered adapter and the bearing inner ring member such that the bearing assembly will be secured to the shaft. The securement means further provides an annular groove having a predetermined axial width defined between opposed faces of the bearing inner ring member and the annular flange. Preferably, the first end of the tapered adapter defines threads therearound. In this case, the securement means may comprise a rotatable nut engaging the threads.

In some exemplary constructions, the bearing assembly further comprises a removal ring having an annular lip portion operatively received in the annular groove defined between opposed faces of the bearing inner ring member and the annular flange. Separation means are also provided for urging the bearing inner ring member and the tapered adapter axially apart such that the bearing assembly will be released from the shaft. Preferably, the separation means comprises a plurality of threaded holes defined in the removal ring for receipt of a plurality of threaded members therethrough. Further, a plurality of threaded members are provided threadingly engaging the holes so that the annular lip portion of the removal ring may be urged against the annular flange to effect separation of the inner ring member from the tapered adapter.

The removal ring may comprise a unitary ring maintained about the tapered adapter during use of the bearing assembly. Alternatively, the removal ring may comprise a plurality of removal ring segments adapted to be secured together into a rigid member. Each such segment defines an arcuate shaft receiving portion arranged so that when the removal ring is secured together the segments will define a circular shaft receiving interior.

In present preferred embodiments, the bearing assembly further comprises at least one seal assembly extending between the bearing inner ring member and the bearing outer ring member to facilitate operative isolation between an ambient environment and an interior of the bearing assembly in which the plurality of bearing elements are located. Preferably, each such seal assembly includes a sealing lip extending radially outward. Such a sealing lip may be in addition to a primary lip provided on the seal assembly. When auxiliary sealing is required in addition to the primary sealing provided by the primary lip, an annular flinger member may be provided to engage the sealing lip. One of these flinger members may be situated in the annular groove defined between opposed faces of the inner ring member and the annular flange. A second annular flinger member may be retained between the nut and the bearing inner ring member on the other side of the bearing assembly.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
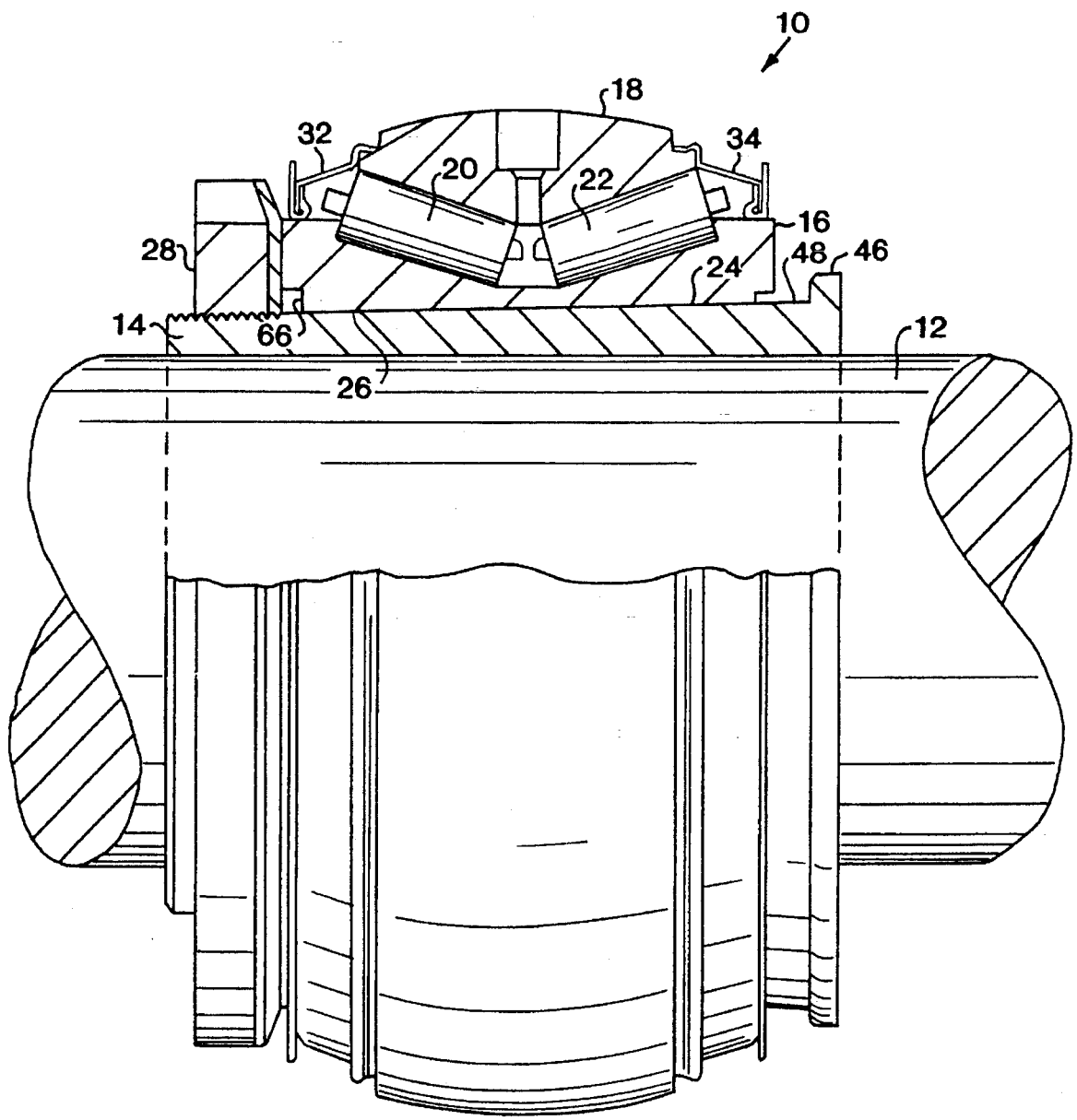
FIG. 1 is a partial cross-sectional view illustrating one manner of use of a bearing assembly constructed in accordance with the present invention.

Repeat use of reference characters in the present specification and drawings is intending to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIG. 1, a bearing assembly (generally indicated at 10) constructed in accordance with the present invention is shown secured to a shaft 12. Bearing assembly 10 includes a tapered adapter 14 through which shaft 12 extends. A bearing inner ring member 16 is received about tapered adapter 14. As shown, inner ring member 16 defines an inner race way about its outer circumferential surface. An outer ring member 18 is further provided having an outer race way situated in opposition to the inner race way defined on inner ring member 16. A plurality of bearing elements, such as roller bearings 20 and 22, are disposed between the inner race way and the outer race way to facilitate relative rotation between ring members 16 and 18. While roller bearings are illustrated, it should be appreciated that other suitable types of bearing elements, such as ball bearings, may also be utilized for this purpose.

As shown, tapered adapter 14 includes a first end of a lesser diameter extending into a second end of greater diameter. A tapered outer surface 24 is defined between the first end and the second end of tapered adapter 14. As shown, inner ring member 16 defines a tapered inner surface 26 generally complementary to tapered outer surface 24. Tapered adapter 14 further defines a radial opening, or slot, extending along its entire axial length. This radial opening allows adapter 14 to contract about shaft 12 when tapered outer surface 24 and tapered inner surface 28 are moved axially together. As a result, positive clamping of bearing assembly 10 with respect to shaft 12 is achieved.

In presently preferred embodiments, securement of bearing assembly 10 as described is achieved by rotating a nut 28 which engages threads defined about the lesser diameter end of tapered adapter 14. In some cases, it may be desirable in the construction of bearing assembly 10 to configure inner ring member 16 having a retaining ring immediately outboard of bearing 20. Such a retaining ring may be maintained in position by nut 28 during use.

As shown, bearing assembly 10 includes a pair of annular sealing assemblies 32 and 34 located on a respective opposite axial sides thereof. Seal assemblies 32 and 34 function to isolate the interior of bearing assembly 10 from the ambient environment for the discussed reasons.

Figure 1A:
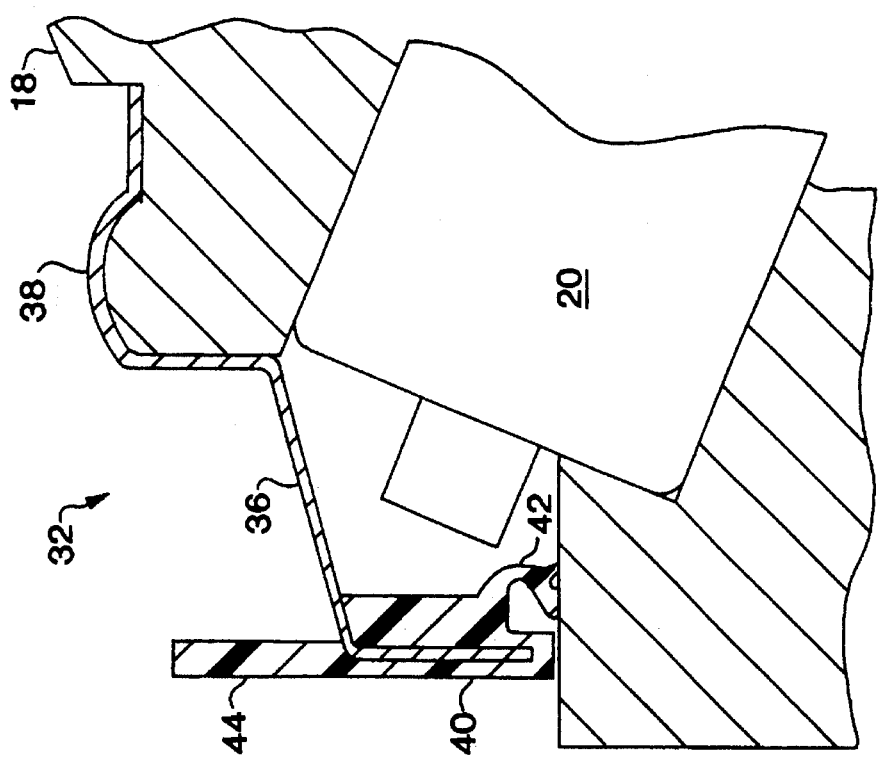
FIG. 1A is an enlarged partial cross-sectional view of a seal assembly provided on the bearing of FIG. 1.

Referring now to FIG. 1A, the construction of seal assembly 32 will be described in detail. While the construction of seal assembly 34 will not be described in such detail for purposes of brevity, it should be understood that seal assembly 34 is similarly constructed.

Seal assembly 32 includes a metallic band 36 having a ridge portion 38 clamped onto outer ring member 18 as shown. As a result, ridge portion 38 is retained by outer ring member 18 during operation. At its opposite end, metallic band 38 carries an elastomeric member 40. Elastomeric member 40 includes a primary lip 42 contacting an outer circumferential surface of inner ring member 16. Lip 42 is biased to remain in contact with inner ring member 16 as it is rotated. Preferably, lip 42 will have a labyrinthine configuration to enhance its sealing performance. For reasons which will be described more fully below, member 40 further includes a sealing lip 44 extending radially outward. Sealing lip 44 will not be functional in the manner of use illustrated in FIG. 1.

Referring again to FIG. 1, adapter 14 further comprises an annular flange 46 located proximate its larger diameter end. Bearing assembly 10 is configured such that an annular groove 48 will be defined between opposed side walls of inner ring member 16 and annular flange 46 upon securement of bearing assembly 10 to shaft 12.

Figure 2:
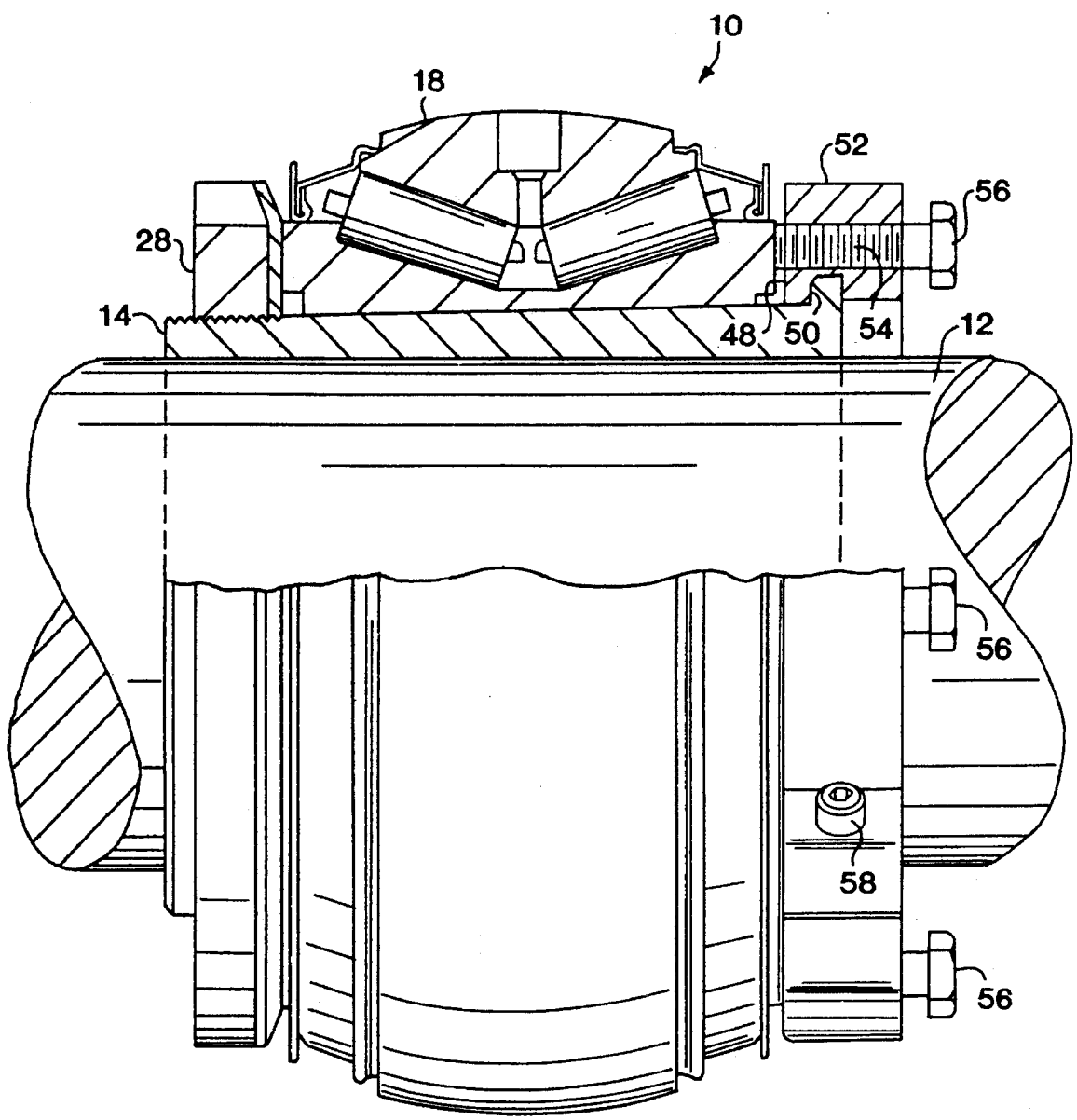
FIG. 2 is a view similar FIG. 1 illustrating another manner of use of the bearing assembly thereof.

Referring now to FIG. 2, an advantage of providing annular groove 48 will now be described. Specifically, annular groove 48 may receive a circumferential holding lip 50 defined about the interior of a removal ring 52. Removal ring 52 defines therein a plurality of threaded holes, such as hole 54, which threadably receive corresponding threaded members, such as bolts 56. When rotated, bolts 56 engage the side wall of inner ring member 16 as shown. As a result of the simultaneous engagement of lip 50 with annular flange 46, inner ring member 16 and tapered adapter 14 will be urged axially apart. In this manner, bearing assembly 10 may be removed from shaft 12.

In the configuration shown in FIG. 2, removal ring 52 comprises a plurality of segments which may be secured together into a rigid member via screws, such as screw 58, or other suitable means of attachment. Each of the segments defines an arcuate shaft receiving portion such that a circular shaft receiving interior is defined when the segments are secured together. This construction allows removal ring 52 to be removed from bearing assembly during periods in which the bearing assembly is in use. A suitable removal ring is disclosed in U.S. patent application Ser. No. 07/957, 666, filed Oct. 7, 1992 by the present inventor U.S. Pat. No. 5,373,636 and incorporated herein by reference.

Figure 3A:
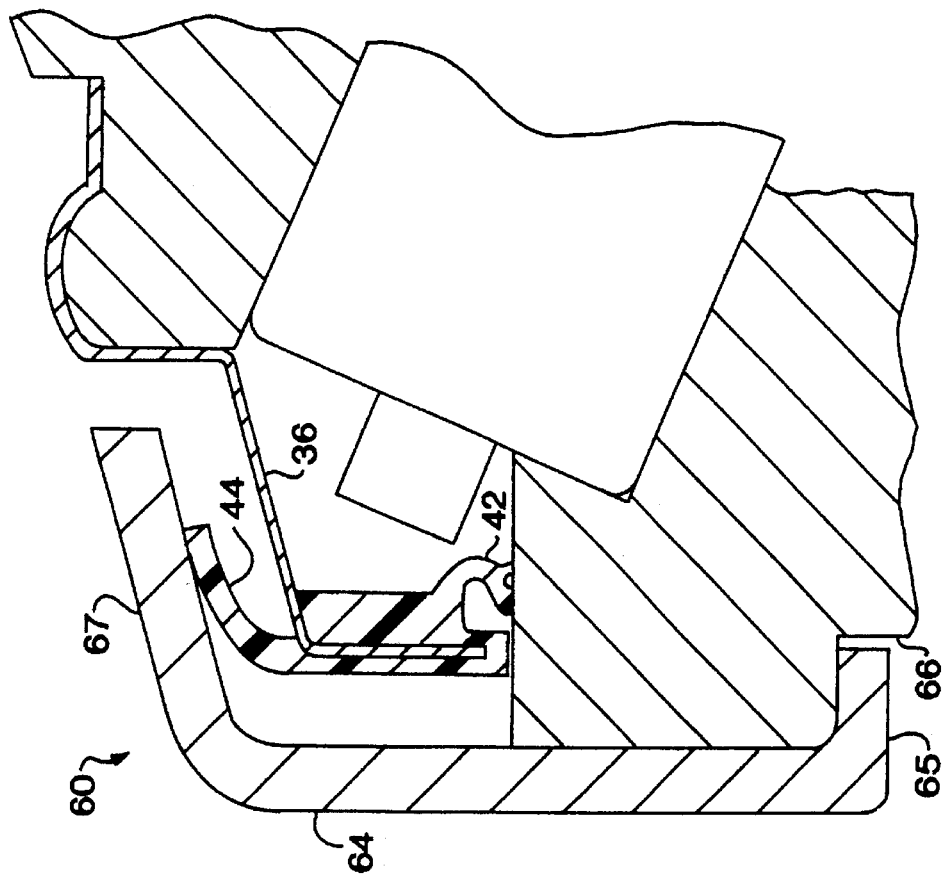
FIG. 3A is a view similar to FIG. 1A illustrating the seal assembly in the manner of use as shown in FIG. 3.
Figure 3:
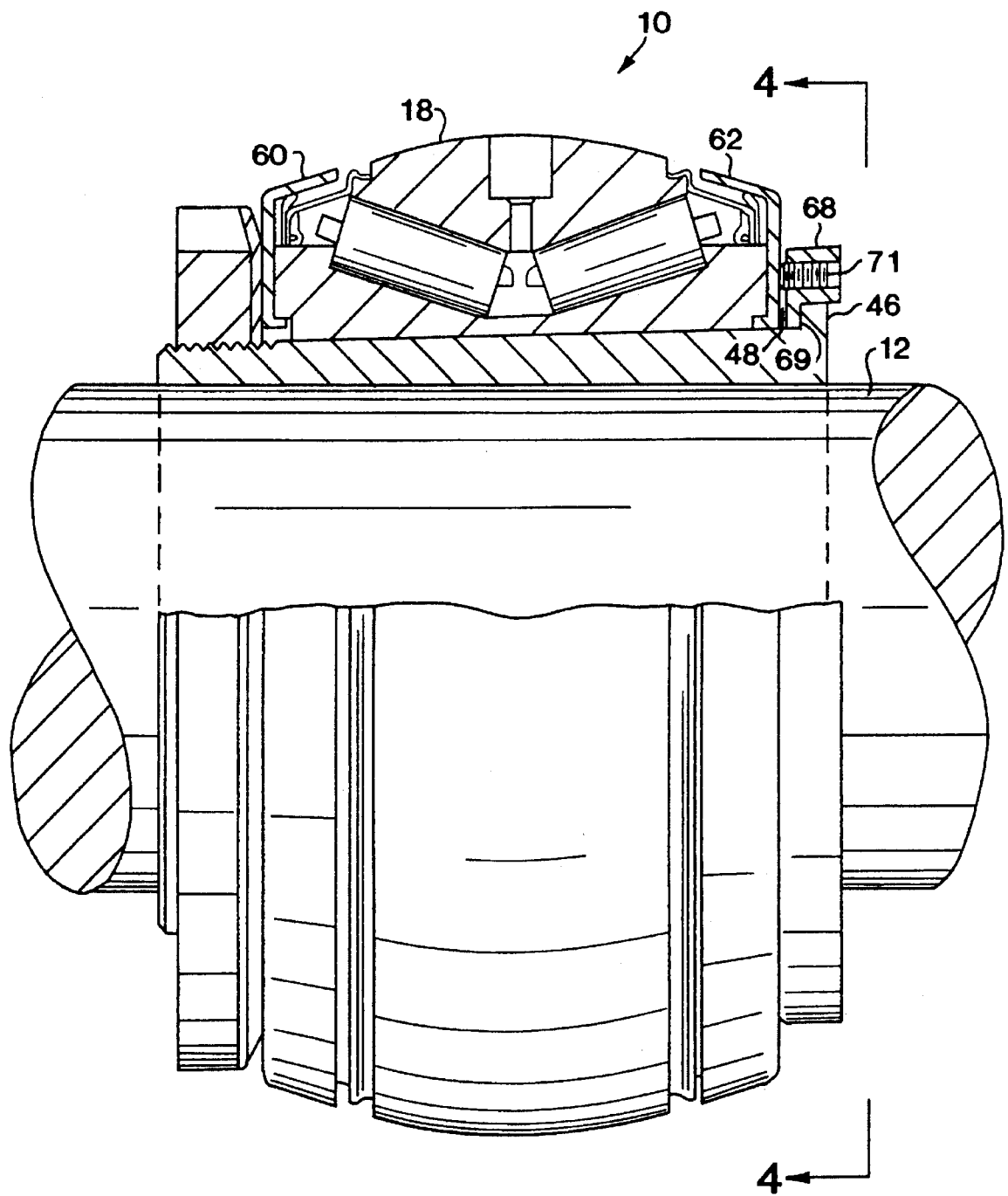
FIG. 3 is a view similar to FIG. 1 illustrating a still further manner of use of the bearing assembly thereof.
Figure 4:
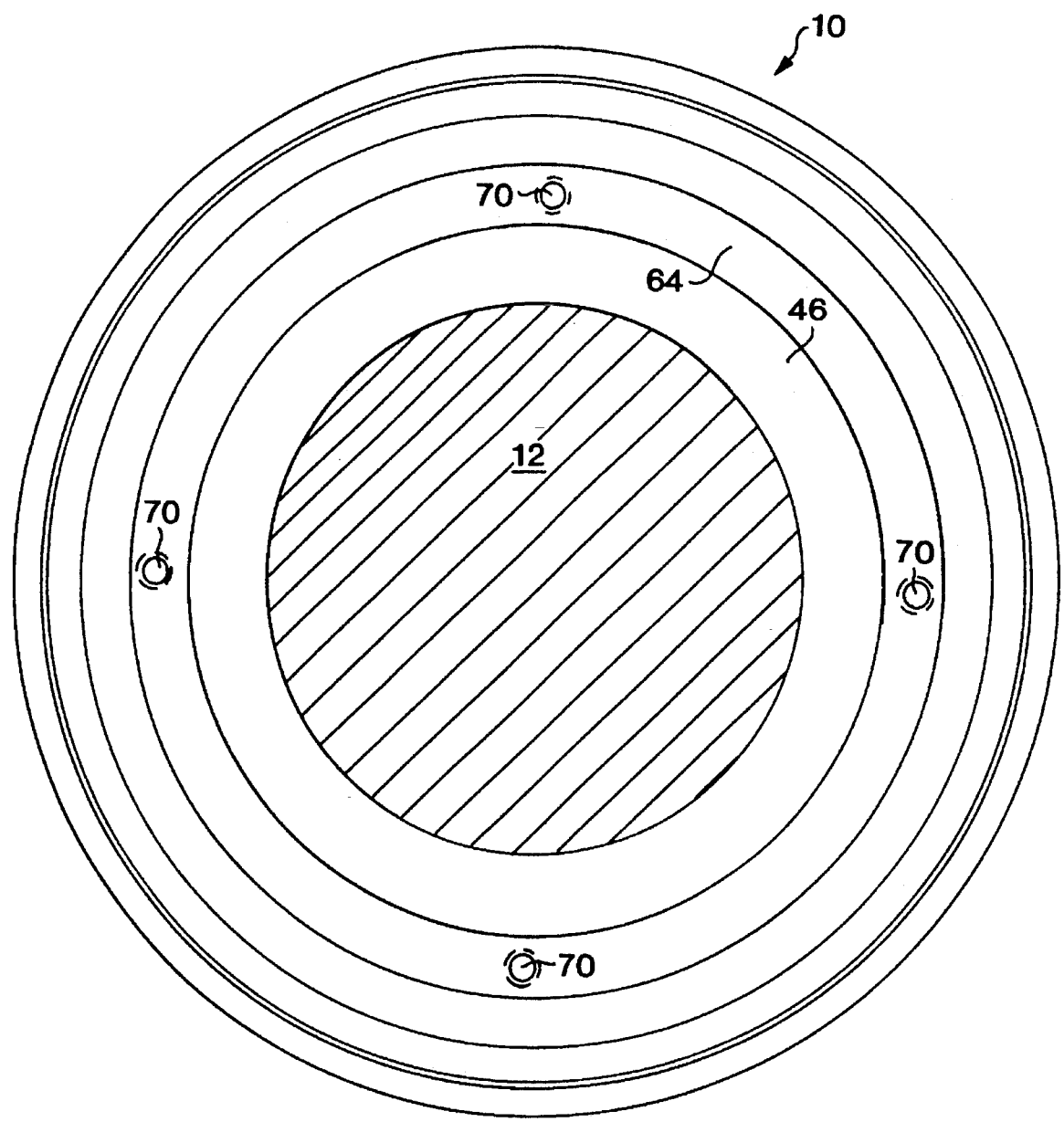
FIG. 4 is an end view as taken along lines 4—4 of FIG. 3.

FIG. 3 illustrates another manner of use of bearing assembly 10 which may be preferable in some applications. In this case, bearing assembly 10 has been fitted with a pair of annular flinger members 60 and 62. Flinger member 60 is retained between nut 28 and retaining ring 30 as shown. Similarly, flinger member 62 is retained on an opposite side of bearing assembly 10 in groove 48.

The function of flinger members 60 and 62 can be explained most easily with reference to FIG. 3A. While only flinger member 60 is specifically illustrated in FIG. 3A, is should be understood that flinger member 62 would be functionally similar. As shown, flinger 60 has a portion 64 extending radially outward in a direction substantially perpendicular to the axis of rotation of shaft 12.

A second portion 65 integrally extends inward from portion 64 in a direction substantially parallel to the axis of rotation of shaft 12. As shown, portion 65 is received in an annular notch 66 defined in the outer side wall of inner ring member 16. This construction allows flinger members 60 and 62 to be centered as they are installed on bearing assembly 10. If the outer surface of tapered adapter 14 were used to achieve such centering, it may be necessary to construct flinger members 60 and 62 having different inner diameters corresponding to the respective outer diameters at the ends of tapered adapter 14. The illustrated construction allows flinger members 60 and 62 to be identical.

An oblique portion 67 integrally extends from portion 64 in a direction substantially parallel to metallic band 36 as shown. As a result, the inner surface of portion 67 engages radial lip 44. The engagement of lip 44 with flinger member 62 in this manner provides auxiliary sealing in addition to the sealing provided by sealing lip 42. Such auxiliary sealing may be desirable in applications where a severe degree of contaminates may be expected.

In this case, removal ring 68 is preferably a unitary ring which remains in position during use of bearing assembly 10. Like removal ring 52, removal ring 68 includes a holding lip, here identified as 69. It will be appreciated that removal ring 68 has a generally more compact appearance than removal ring 52, which is desirable because removal ring 68 remains in position during use.

Removal ring 68 further includes a plurality of threaded holes 70 into which threaded elements may be received. To enhance compactness of removal ring 68, the threaded elements are preferably socketed screws 71. Like removal ring 52, screws 71 are utilized to facilitate removal of bearing assembly 10 from shaft 12. Additionally, however, screws 71 may be utilized to maintain flinger member 62 tightly against inner ring member 16, as shown.

While preferred embodiments of the invention have been shown and described, modifications and variations may be made thereto by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for receipt of a shaft therein, said bearing assembly comprising:

a tapered adapter defining a first axial bore for receipt of the shaft therethrough and having a radial slot extending along the length thereof, said tapered adapter further defining a tapered outer surface extending between a first end of lesser diameter and a second end of greater diameter than the first end, said tapered adapter having an annular flange proximate said second end;

a bearing inner ring member defining an inner raceway about an outer surface thereof and further defining a second axial bore having a tapered inner surface for receipt of said tapered adapter therein;

a bearing outer ring member defining an outer raceway about an inner surface thereof, said bearing outer ring member situated such that said outer raceway is radially outward of said inner raceway;

a plurality of bearing elements disposed between said inner raceway and said outer raceway; and securement means for axially moving together said tapered adapter and said bearing inner ring member such that said bearing assembly will be secured to the shaft and an annular groove having at least a predetermined axial width will be defined between opposed faces of said bearing inner ring member and said annular flange.

2. A bearing assembly as set forth in claim 1, further comprising:

a removal ring having an annular lip portion operatively received in said annular groove defined between opposed faces of said bearing inner ring member and said annular flange; and separation means for urging said bearing inner ring member and said tapered adapter axially apart such that said bearing assembly will be released from said shaft.

3. A bearing assembly as set forth in claim 2, wherein said removal ring comprises a unitary ring maintained about said tapered adapter during use of said bearing assembly.

4. A bearing assembly as set forth in claim 3, wherein said separation means comprises:

a plurality of threaded holes defined in said removal ring for receipt of a plurality of threaded members therethrough; and a plurality of threaded members threadingly engaged in said holes so that said annular lip portion of removal ring can be urged against said annular flange to effect separation of said bearing inner ring member from said tapered adapter.

5. A bearing assembly as set forth in claim 2, wherein said removal ring comprises a plurality of removal ring segments adapted to be secured together into a rigid member, each of said removal ring segments defining an arcuate shaft receiving portion arranged so that when said removal ring is secured together said removal ring segments define a circular shaft receiving interior.

6. A bearing assembly as set forth in claim 5, wherein said separation means comprises:

a plurality of threaded holes defined in said removal ring for receipt of a plurality of threaded members therethrough; and a plurality of threaded members threadingly engaged in said holes so that said annular lip portion of said removal ring can be urged against said annular flange to effect separation of said bearing inner ring member from said tapered adapter.

7. A bearing assembly as set forth in claim 1, further comprising at least one seal assembly extending between said bearing inner ring member and said bearing outer ring member to facilitate operative isolation between an ambient environment and an interior of said bearing assembly in which said plurality of bearing elements are located.

8. A bearing assembly as set forth in claim 7, wherein said at least one seal assembly includes a sealing lip extending radially outward.

9. A bearing assembly for receipt of a shaft therein, said bearing assembly comprising:
- a tapered adapter defining a first axial bore for receipt of the shaft therethrough and having a radial slot extending along the length thereof, said tapered adapter further defining a tapered outer surface extending between a first end of lesser diameter and a second end of greater diameter than the first end, said tapered adapter having an annular flange proximate said second end;
- a bearing inner ring member defining an inner raceway about an outer surface thereof and further defining a second axial bore having a tapered inner surface for receipt of said tapered adapter therein;
- a bearing outer ring member defining an outer raceway about an inner surface thereof, said bearing outer ring member situated such that said outer raceway is radially outward of said inner raceway;
- a plurality of bearing elements disposed between said inner raceway and said outer raceway;
- securement means for axially moving together said tapered adapter and said bearing inner ring member such that said bearing assembly will be secured to the shaft and an annular groove having at least a predetermined axial width will be defined between opposed faces of said bearing inner ring member and said annular flange;
- at least one seal assembly extending between said bearing inner ring member and said bearing outer ring member to facilitate operative isolation between an ambient environment and an interior of said bearing assembly in which said plurality of bearing elements are located, wherein said at least said one seal assembly includes a sealing lip extending radially outward; and
- at least one respective annular flinger member engaging said sealing lip of said at least one seal assembly.

10. A bearing assembly as set forth in claim 9, wherein said at least one seal assembly is affixed to said bearing outer ring member and includes a primary lip contacting said bearing inner ring member to provide primary sealing therebetween, said sealing lip thereby providing auxiliary sealing.

11. A bearing assembly as set forth in claim 9, wherein a first annular flinger member is situated in said annular groove defined between opposed faces of said bearing inner ring member and said annular flange.

12. A bearing assembly as set forth in claim 11, further comprising:
- a removal ring having an annular lip portion operatively received said annular flinger member and said annular flange; and
- separation means for urging said bearing inner ring member and said tapered adapter apart such that said bearing assembly will be released from shaft.

13. A bearing assembly as set forth in claim 12, wherein said removal ring comprises a unitary ring maintained about said tapered adapter during use of said bearing assembly.

14. A bearing assembly as set forth in claim 13, wherein said separation means comprises:
- a plurality of threaded holes defined in said removal ring for receipt of a plurality of threaded members therethrough; and
- a plurality of threaded members threadingly engaged in said holes so that said annular lip portion of said removal ring can be urged against said annular flange to effect separation of said bearing inner ring member from said tapered adapter.

15. A bearing assembly as set forth in claim 14, wherein at least some of said threaded members operatively engage said first flinger member to maintain said first flinger member tightly against said inner ring member.

16. A bearing assembly as set forth in claim 11, wherein said at least one annular flinger member comprises a pair of annular flinger members situated on opposite sides of said bearing assembly.

17. A bearing assembly as set forth in claim 16, wherein said first end of said tapered adapter defines threads therearound for a portion of the length thereof and said securement means comprise a rotatable nut engaging said threads, a second of said pair of annular flinger members being retained between said nut and said inner ring member.

18. An arrangement for securing a device such as a bearing having a tapered inner bore to a shaft and effecting removal of said device therefrom, said arrangement comprising:
- a tapered adapter defining a first axial bore for receipt of the shaft therethrough and having a radial slot extending along the length thereof, said tapered adapter further defining a tapered outer surface generally complementary to the tapered inner bore of the device extending between a first end of lesser diameter and a second end of greater diameter than the first end, said tapered adapter having an annular flange proximate said second end;
- securement means for axially moving said tapered adapter into the tapered bore of the device such that the device will be secured to the shaft and an annular groove having at least a predetermined axial width will be defined between opposed faces of a portion of said device and said annular flange;
- a removal ring having an annular lip portion operatively received in said annular groove; and
- separation means for urging said tapered adapter out of said tapered inner bore such that said device will be released from said shaft.

19. An arrangement as set forth in claim 18, wherein said removal ring comprises a unitary ring maintained about said tapered adapter.

20. An arrangement as set forth in claim 19, wherein said separation means comprises:
- a plurality of threaded holes defined in said removal ring for receipt of a plurality of threaded members therethrough, said holes being located so that threaded members received therethrough will engage said portion of said device; and
- a plurality of threaded members threadingly engaged in said holes so that said removal ring can be urged against said annular flange to effect separation of said device from said tapered adapter.

21. A bearing assembly as set forth in claim 18, wherein said removal ring comprises a plurality of removal ring segments adapted to be secured together into a rigid member, each of said removal ring segments defining an arcuate shaft receiving portion arranged so that when said removal ring is secured together said removal ring segments define a circular shaft receiving interior.

22. An arrangement as set forth in claim 21, wherein said separation means comprises:

a plurality of threaded holes defined in said removal ring for receipt of a plurality of threaded members therethrough, said holes being located so that threaded members received therethrough will engage said portion of said device; and a plurality of threaded members threadingly engaged in said holes so that said removal ring can be urged against said annular flange to effect separation of said device from said tapered adapter.

* * * * *